United States Patent [19]

Hylton et al.

[11] Patent Number: 5,335,552
[45] Date of Patent: Aug. 9, 1994

[54] DEVICE FOR ACCURATELY MEASURING MASS FLOW OF GASES

[75] Inventors: James O. Hylton, Clinton; Carl J. Remenyik, Knoxville, both of Tenn.

[73] Assignee: Martin Marietta Energy Systems, Inc., Oak Ridge, Tenn.

[21] Appl. No.: 88,122

[22] Filed: Jul. 7, 1993

[51] Int. Cl.⁵ .................... G01F 1/00; G01G 11/04
[52] U.S. Cl. ........................................ 73/861
[58] Field of Search ................. 73/861, 223, 3; 177/207

[56] References Cited

U.S. PATENT DOCUMENTS 3,068,683 12/1962 Petterson et al. ................ 73/3

Primary Examiner—Herbert Goldstein
Attorney, Agent, or Firm—Martin J. Skinner; James M. Spicer; Harold W. Adams

[57] ABSTRACT

A device for measuring mass flow of gases which utilizes a substantially buoyant pressure vessel suspended within a fluid/liquid in an enclosure. The pressure vessel is connected to a weighing device for continuously determining weight change of the vessel as a function of the amount of gas within the pressure vessel. In the preferred embodiment, this pressure vessel is formed from inner and outer right circular cylindrical hulls, with a volume between the hulls being vented to the atmosphere external the enclosure. The fluid/liquid, normally in the form of water typically with an added detergent, is contained within an enclosure with the fluid/liquid being at a level such that the pressure vessel is suspended beneath this level but above a bottom of the enclosure. The buoyant pressure vessel can be interconnected with selected valves to an auxiliary pressure vessel so that initial flow can be established to or from the auxiliary pressure vessel prior to flow to or from the buoyant pressure vessel.

20 Claims, 4 Drawing Sheets

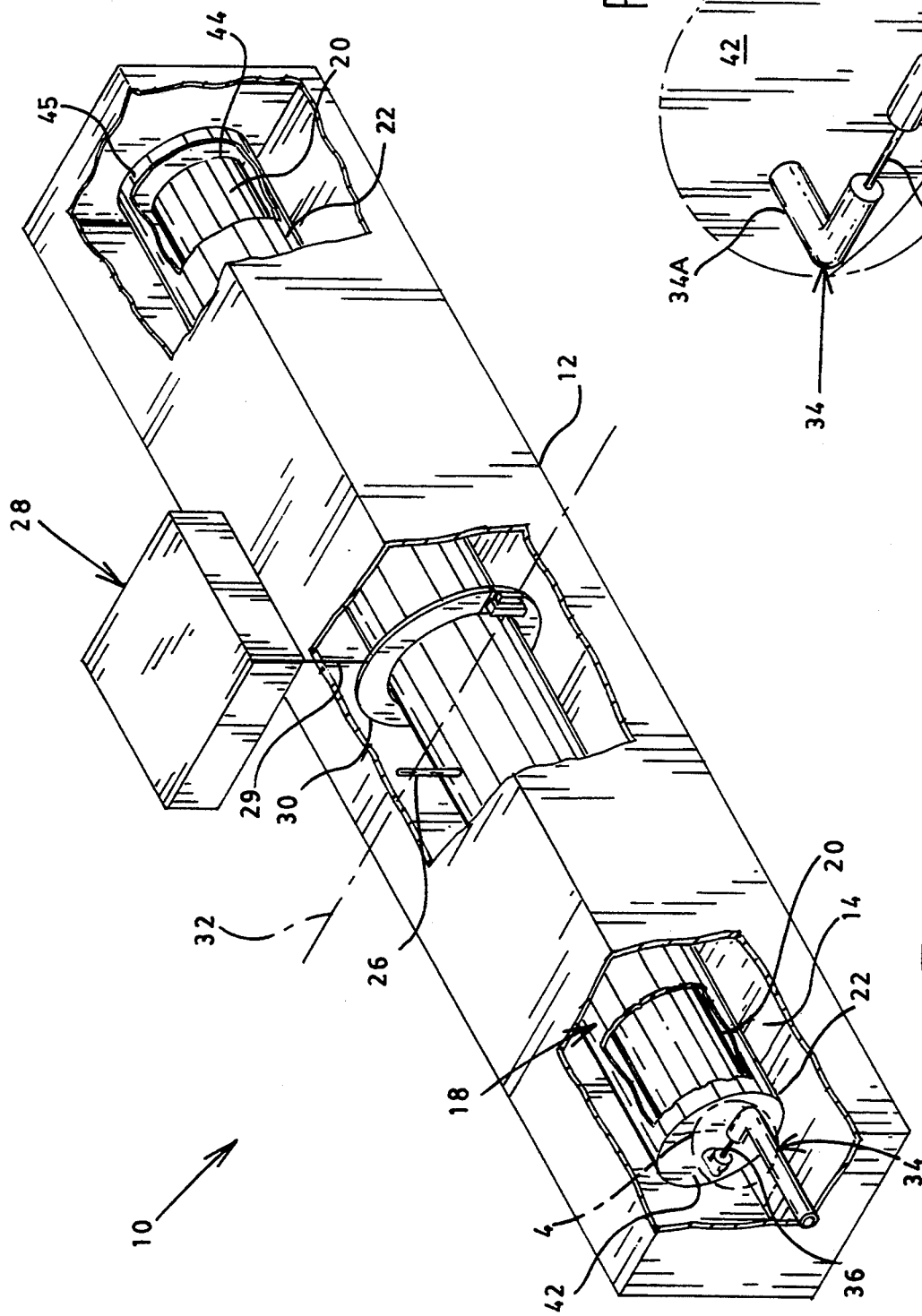
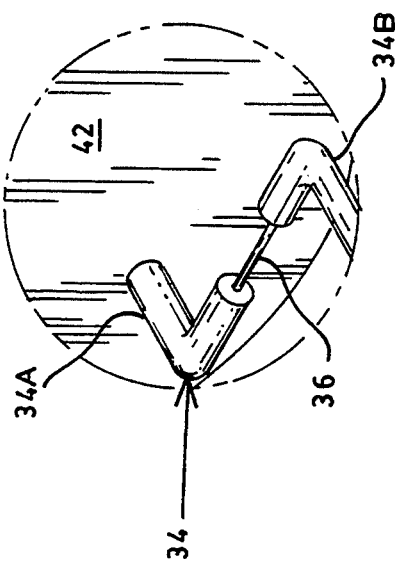

DEVICE FOR ACCURATELY MEASURING MASS FLOW OF GASES

The U.S. Government has rights in this invention pursuant to Contract No. DE-AC05-84OR21400 awarded by the U.S. Department of Energy with Martin Marietta Energy Systems, Inc.

TECHNICAL FIELD

The present invention relates to mass flow measurement of gases, and more particularly to a gravimetric-type device for mass flow measurement that can be utilized as a primary standard to calibrate mass flow controllers used for precision flow of gases in various applications.

BACKGROUND ART

Many different processes in the fabrication of microelectronic circuits require precise metering of process gas flows. A variety of common and exotic gases are used extensively in this field. This is just one of several technologies that require such control of gas flows. To obtain economically acceptable product yields, process gas mass flowmeters and controllers (MFCs) must have high accuracy and precision, as well as reliability. Further, such requirements will increase because of intense competition and the rapid rate of technological advancement in the semiconductor industry.

Mass flowmeter calibration is an essential component of any precision flowmeter system. Currently there are two principal approaches to the measurement of mass flowrates through a flowmeter calibration test. In one, a vessel is charged with the gas to be used, and the weight of the vessel is measured (as a function of time) as the gas leaves the vessel and passes through the unit under test. Since the weight of the gas, even at the start of outflow of the gas, is significantly less than that of the weight of the vessel, the accuracy of weight measurement is difficult to achieve. In addition, the vessel must be disconnected from the unit under test in order to make the measurements since any connecting element affects the weight.

Another system, as utilized by the Bureau of Standards, utilizes careful measurement of temperatures, pressures and volumes of components during flow such that all of these variables are utilized to compute (via conventional gas equations) the gas flow. Accordingly, the system is very complex.

Accordingly, it is an object of the present invention to provide a device for the accurate determination of mass flow of a gas wherein the device remains connected to apparatus into which the gas is flowing.

Another object of the present invention is to provide a mass flow measuring device having a significantly greater accuracy than devices of the prior art.

A further object of the present invention is to provide a device for mass flow that relies only upon simple apparatus for measuring weight change of a vessel, where the weight change of gas in the vessel is a major part of the weight measured in the system.

It is also an object of the present invention to utilize a gravimetric measurement of weight change of a substantially buoyant body for the accurate measurement of gas mass flow.

Also, it is an object of the present invention to provide a device for determining mass flow in a significantly reduced time; for example, in a few minutes as contrasted to several hours or days.

It is still another object of the present invention to provide a device for determining mass flow of gases where the gases are extremely corrosive.

These and other objects of the present invention will become apparent upon a consideration of the drawings referred to below, and the detailed description thereof.

DISCLOSURE OF THE INVENTION

In accordance with the present invention, a vessel for receiving a gas to be used in the mass flow determination is nearly buoyant in a fluid, particularly a liquid, this vessel being supported from an accurate weight measurement device. Gas is introduced into the vessel through a fine capillary tube arranged such that substantially no loading of the vessel occurs from this tube. This permits the vessel to remain connected to any external system during weight measurements. In the preferred form, the vessel is an elongated right circular cylinder having a gas feed in one end, and the vessel suspended from a central point from a precision weighing mechanism. The vessel is double-hulled such that any variation of the internal volume due to gas does not affect the total volume and thus the displacement of the fluid by the vessel. The volume between the hulls is vented to assure this stationary volume of the total vessel. When used as a calibration device, the present invention is connected through valves to the unit being calibrated. Weight changes, as a function of time, are recorded during either inflow or outflow of gas, with these weight changes being translatable into mass flow rates. In applications where "jitter" may exist during the first stage of gas flow, gas flow can be initiated using an auxiliary vessel that is not within the buoyant system.

BRIEF DESCRIPTION OF THE DRAWINGS

FIG. 2 is an isometric drawing, partially cut away, of one embodiment of a gravimetric mass flow measuring unit according to the present invention.

FIG. 4 is an enlargement of a capillary tube arrangement as utilized in the present invention to minimize loading on weight measuring apparatus by the gas tube leading from the unit to an external gas flow system, this capillary tube arrangement indicated at 4 in FIG. 2.

BEST MODE FOR CARRYING OUT THE INVENTION

Figure 1:
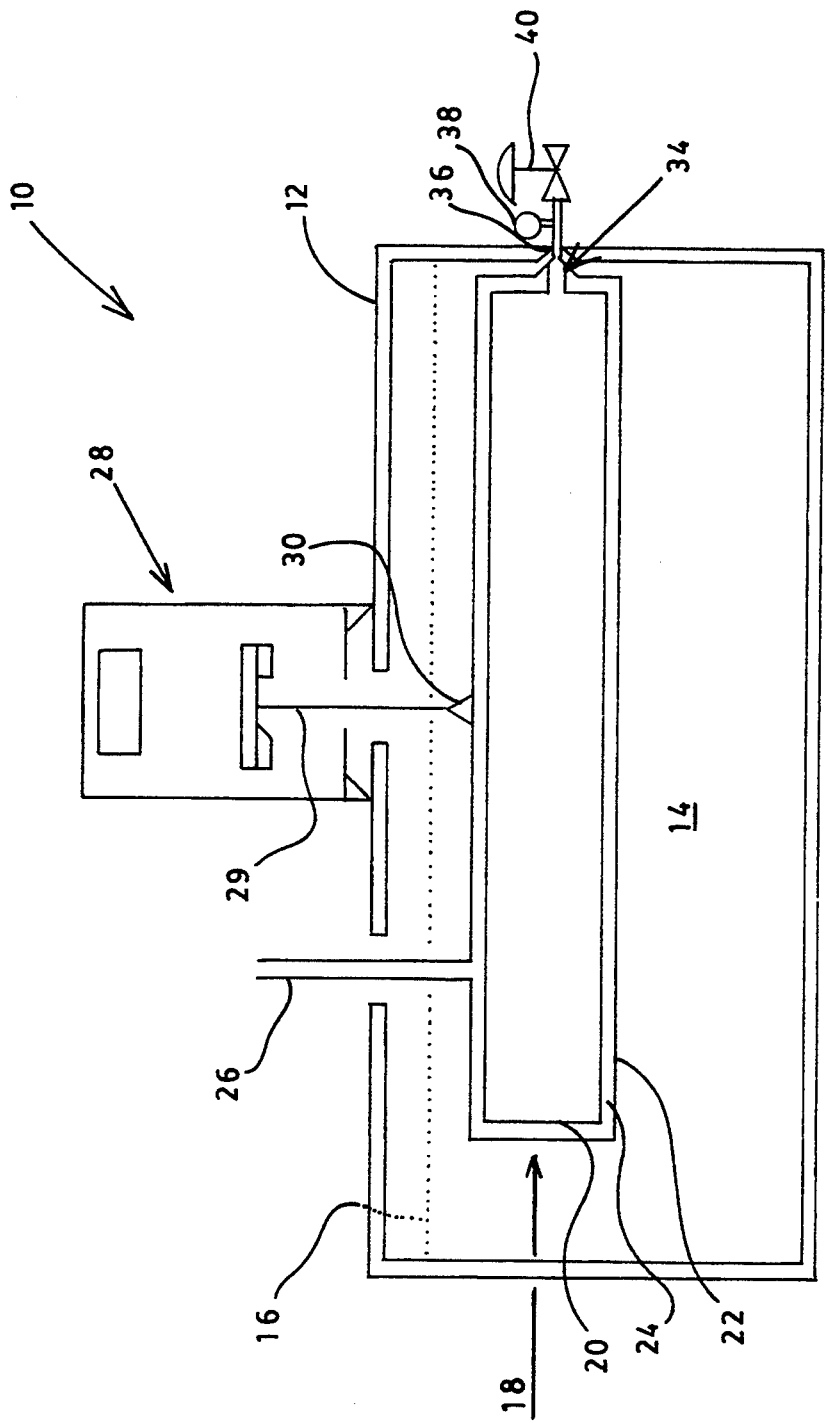
FIG. 1 is a block diagram illustrating the major components to accomplish the principles of the present invention.

The major components of the present invention are generally indicated at 10 of FIG. 1. A tank-like enclosure 12 contains a fluid 14 to a level generally indicated at 16. Typically, this fluid 14 is a liquid such as water; however, other fluids and liquids can be utilized according to the buoyancy needed, as described below. For convenience, only liquids (e.g., water) will be discussed hereinafter. Preferably provision (not shown) is made to maintain a uniform temperature throughout the liquid.

Positioned within this enclosure 12 is a pressure vessel 18 that preferably has two hulls: an inner hull 20; and an outer hull 22 forming a volume 24 therebetween. It will be understood that for some applications, only a single hull can be used. This volume 24 between the hulls 20, 22 is provided with a vent 26 for purposes described hereinafter. The pressure vessel 18 is fabricated of such material that it is almost buoyant in the liquid 14 such that it positions itself just below the liquid surface 16, as shown. Although this FIG. 1 illustrates the inner hull 20 being independent from the outer hull 22, in actual practice these hulls 20, 22 can share one common end wall 42 as in FIG. 2. A second end 44 of the inner hull 20 is spaced from a second end 45 of the outer hull 22 to permit expansion and contraction. The double-walled vessel 18, with the vented annulus 24 and the free end 44, permit some expansion in the volume of the inner hull 20 without changing the overall volume of the vessel 18. Thus, for any weight of gas, the buoyancy of the basic vessel 18 is not affected by such internal volume change. The pressure vessel 18 is supported from a weighing device 28 with a suitable yoke 30 using, typically, a wire or chain 29.

Figure 3:
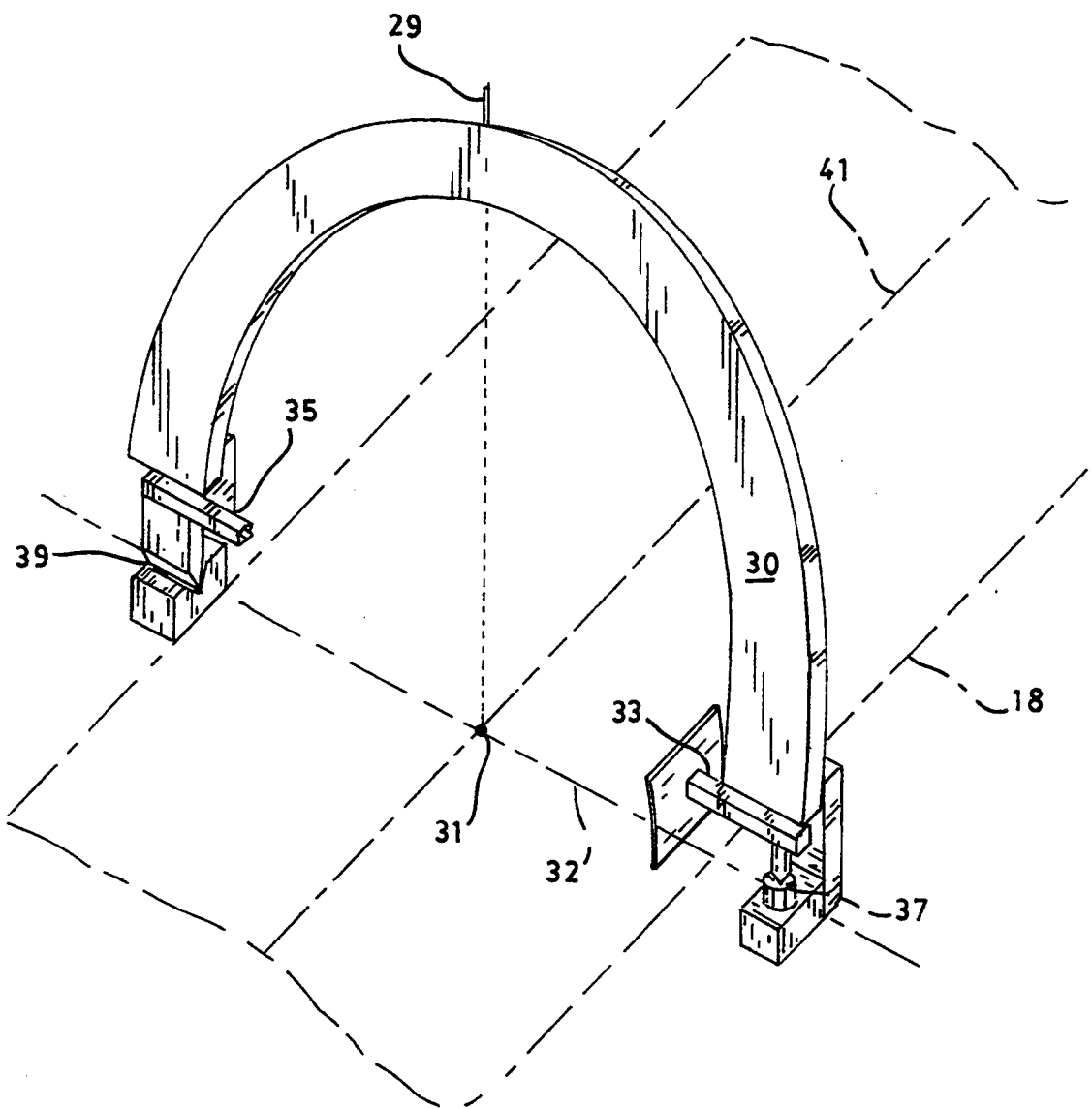
FIG. 3 is a drawing illustrating one embodiment of pivotal support for the buoyant vessel of FIG. 2.

Details of one embodiment of this support are shown in FIG. 3. The yoke 30 supports the pressure vessel 18 at two points along a transverse axis 32 by means of two trunnions 33, 35 attached to the vessel 18. One of the trunnions 33 engages one side of the yoke 30 through a point pivot 37, and the other trunnion 35 engages the other side of the yoke 30 through a wedge pivot 39. The contacts between the trunnions 33 and 35, and the pivots 37, 39 lie on the transverse axis 32. That transverse axis 32 passes through the center of mass 31 of gas contained in the pressure vessel 18. This center of mass 31 of the gas is a point in space, called the pivotal point of support, where three lines intersect. It is primarily the intersection of the transverse axis 32 and the continuation of the wire or chain 29 from which the yoke 30 is supported from the weighing device 28. Less importantly, but useful, is that the point 31 also lies on the longitudinal axis 41 of the inner hull 20, the outer hull 22, and the body of gas inside the axially symmetrical vessel 18.

In the preferred embodiment, the weighing device 28 provides for repositioning the pressure vessel 18 to substantially the same level in the liquid 14 even when gas is added to or withdrawn from the pressure vessel 18 giving a change in weight thereto. By this is meant there are two operating modes, called the discharge mode and receiving mode, both of which will be described hereinafter.

Typically, a "Micro-Balance" Mettler Model AE240, provides such repositioning action. Such repositioning reduces any stress upon a gas connecting line 34 that communicates between the interior of the pressure vessel 18 and the exterior of the enclosure 12. As will be discussed in greater detail, this connecting line 34 includes a capillary tube 36 that reduces any loading upon the pressure vessel 18 by the connecting tube 34. Further reduction in loading occurs because the length of the pressure vessel 18 is such that the distance from its support yoke 30 to the connecting tube 34 is relatively long. Exterior to the enclosure 12 typically is positioned a pressure gauge 38 and a valve 40.

One embodiment of the gravimetric device of the present invention is shown in the isometric drawing, partially cutaway, of FIG. 2. In this embodiment, the pressure vessel 18 is a right-circular cylinder formed from concentric cylinders 20, and 22 having one common end wall 42. As in FIG. 1, the annular volume between the two hulls 20, 22 is vented through a capillary tube 26. In order that surface tension of the liquid 14 not act deleteriously upon the vent tube 26, in a preferred embodiment either the liquid 14 or the tube 26 are treated to reduce surface tension or any other extraneous force such that essentially no loading upon the weighing system is imposed by this vent tube 26. For example, a detergent can be added to the liquid 14, particularly if the liquid 14 is water.

FIG. 2, when reviewed together with FIG. 4, illustrates a gas connection line 34 that minimizes loading upon the system during movement of the inner pressure vessel 18. In the embodiment illustrated, which is exemplary of one of several equivalent systems, a portion 34A of the connecting tube 34 exits the vessel 18 through end wall 42 with an open inner end (not shown) in gas flow communication with the inner volume of the inner hull 20. A second portion 34B then extends through the enclosure 12 to be connected to any external piping. Joining the portions 34A, 34B is the aforementioned capillary tube 36. This capillary tube 36 passes through, and is sealed to, closed ends of these portions 34A, 34B such that there can be gas flow therethrough between the volume of the inner hull 20 and exterior equipment. Typically, this capillary tube 36 has an o.d. of about 0.125 in., and an i.d. of about 0.090 in. Thus, this capillary tube forms a torsion member between a fixed body (the enclosure 12) and a slightly moveable body (the pressure vessel 18) such that there is very little load applied to the measuring system.

Major components of the present invention are fabricated from materials generally resistant to chemical reaction with their environment. Thus, a typical material for their fabrication is stainless steel. More reactive materials of construction, such as Monel, can be passivated prior to use. However, even if the gas to be placed within the pressure vessel 18 does react with the inner wall of hull 20, its presence (in the form of reaction products) can be measured by the weighing device 28.

Figure 5:
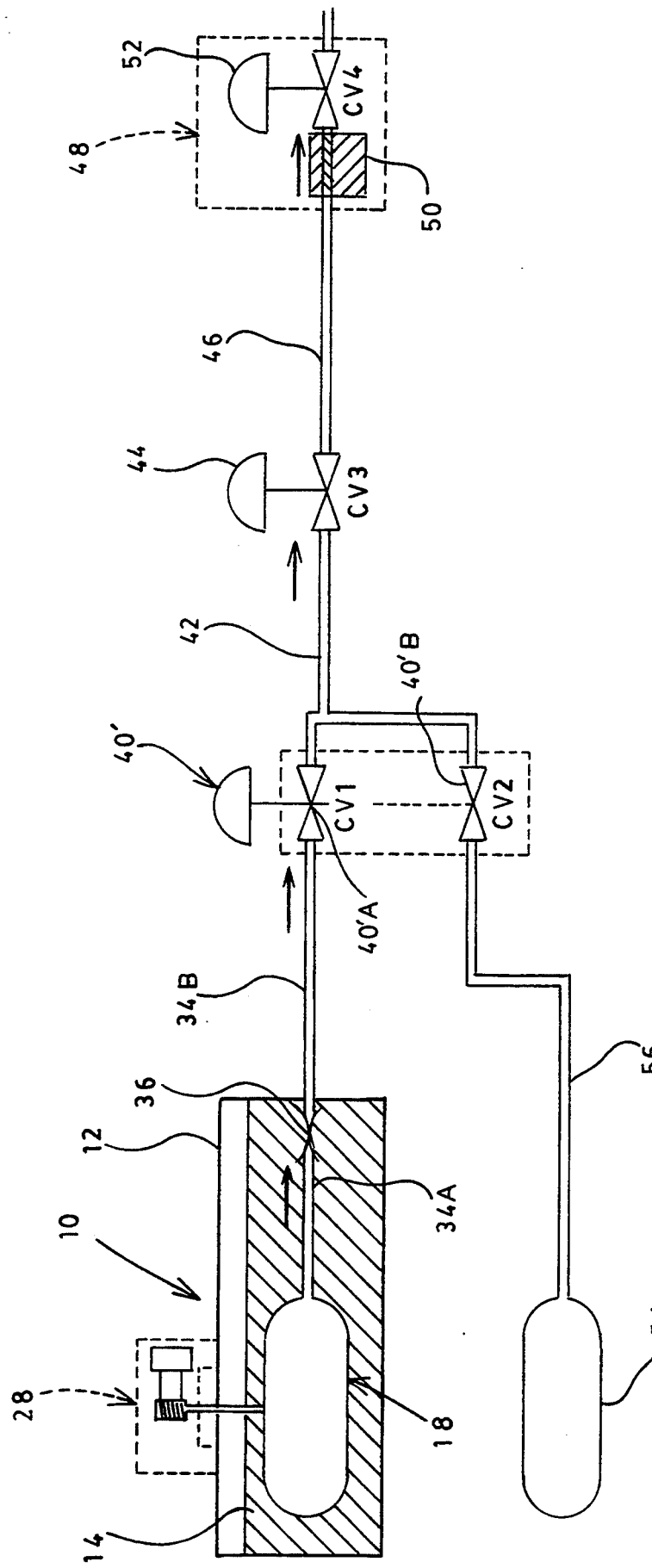
FIG. 5 is a schematic drawing illustrating a system for utilizing the present invention.

FIG. 5 is a schematic drawing depicting a typical utilization of the present invention 10. In this drawing, the pressure vessel 18 is depicted as a single hull vessel although it will be understood that in the preferred embodiment it is double hulled as in FIGS. 1 and 2. The gas connection, made up of portions 34A, 34B and capillary 36, lead to a valve 40' having two portions: 40'A and 40'B. These two portions will be understood from subsequent description of this system. The output line 42 from valve 40' typically is to a cut-off valve 44, with this having an outlet line 46 to a flowmeter 48 that is to be calibrated by the present invention 10. This flowmeter 48 will typically have a flow orifice 50 and a valve 52. Of course, other flowmeters 48 can contain other components according to their particular usage.

For some applications of calibration, initial gas flow from the pressure vessel 18 may cause fluctuations of measurement by the flowmeter 48. To minimize such fluctuations, gas flow can be initiated by dispensing gas from an auxiliary pressure vessel 54 through line 56 and valve 40'B, with valve 40'A being closed. After uniform gas flow is established, valve 40'B is closed, valve 40'A opened, and flow is initiated from pressure vessel 18. It will be understood that gas flow can exist in an opposite direction, as first through the flowmeter 48 to either the pressure vessel 18 or to the auxiliary pressure vessel 54. During gas flow in either direction, the weight measuring unit 28 records weight change of the pressure vessel 18 as a function of time, and the mass flow of the gas is obtained such that the flowmeter 48 is calibrated. It will be understood by persons skilled in the art that any gas flow system will usually include pressure measuring devices. However, since the placement and operation of such will depend upon the particular utilization of the system, they are not shown in this FIG. 4 for simplicity.

As indicated above, there are two ways the system 10 can be operated, called the discharge mode and receiving mode. The discharge mode means that the pressure vessel 18 is filled with the gas initially, pressurized to some predetermined value, for example 100 psi. When the measuring starts, the valve 40 (see FIG. 1 or 5) is opened and gas exits the pressure vessel 18 due to the internal pressure. The other mode, the receiving mode, is operated so that initially the vessel 18 is evacuated. Then when the measuring process begins, the valve 40 is opened and gas flows into the pressure vessel 18 from some source exterior the system 10. The choice between these modes will depend upon the advantages and disadvantages of each for any particular application.

One advantage of the discharge mode is that a large amount of gas can be compressed inside the pressure vessel, thereby allowing the measurement to run for a longer time. Another advantage is that the measurement can be operated at higher mass flow rates, thereby increasing the precision of the measurement.

A disadvantage of the discharge mode is that the pressure in the vessel changes continuously throughout the measurement, and that change affects the operation of any outside system. Thus, to make the flow in the system steady during the measurement, an outside mass flow controller has to compensate for the pressure change. This makes the measurement more difficult, and it also introduces possible sources of inaccuracy. Another disadvantage of this discharge mode is that if there is a reaction between the gas and the wall of the inner hull, and that reaction produces small particles, or if some contaminant particles exist in the vessel from another source, these particles can exit the vessel and contaminate the instrument being calibrated.

An advantage of the receiving mode, on the other hand, is that no contaminating particles can come out of the vessel. Another is that if the vessel is initially evacuated and the measurement is designed to go to one-half atmosphere, for example, then during the time of the measurement the gas flows into the pressure vessel through the collecting capillary at sonic speed. As a consequence, the pressure vessel is effectively decoupled from the outside system because no signal from the changing pressure can penetrate the capillary. Accordingly, the system establishes a steady state operation which can continue throughout the measurement without any adjustments since measurements are not affected by the changing internal pressure.

The disadvantage of the receiving mode is that the amount of gas that can be accumulated in the pressure vessel between initial vacuum and final state of one-half atmosphere is much less than the amount of gas that could be discharged if the pressure changes from 100 psi to 10 psi, or even to 50 psi. The reduction of gas reduces the length of time during which the instrument can be operated, and/or reduces the amount of gas which can pass through the system.

Although flowmeter calibration is one application of the present invention 10, this device can be utilized wherever the rate of gas flow monitoring is desired. Thus, it can be used for the primary control of gas to any process, etc. Also, the total amount of gas dispensed or accumulated can be determined from weight readings of the weighing device 28 taken at the beginning and end of the transfer.

From the foregoing, it will be understood by persons skilled in the art that a very simple and very accurate mass flow measuring device for gases has been provided. Since the vessel either dispensing or receiving gases is substantially buoyant, the vessel itself introduces very little weight to a weighing device. Accordingly, any weight change due to gases leaving or entering the vessel is the primary weight change to the system. Thus, the weight change due to the gases is accurately measured. Further, since provision is made to reduce loading upon the weight measuring element by the components of the device, the present invention can be connected to an external system during the weighing process. Only weight is a variable, except for time, such that accurate mass flow measurements can be made.

It will be noted that in FIG. 2 the yoke 30 completely encircles the buoyant pressure vessel 18; however, in FIG. 3 the yoke 30 is semicircular. Either construction is within the scope of the present invention.

Although not shown in the FIGURES, a "cradle" is typically used within the enclosure 12 to initially support the buoyant pressure vessel 18 during set up of the apparatus. During operation, while the vessel 18 is suspended within the fluid 14, the cradle no longer supports (or even contacts) the vessel 18. However, it prevents abnormal movement of the pressure vessel 18 that otherwise could damage the gas tube 36 and/or the weighing device 28, for example.

Although certain materials and sizes are set forth herein, these are for the purpose of illustration and not for limiting the present invention. Rather, the invention is to be limited only by the appended claims and their equivalents.

It will be noted that in FIG. 2 the yoke 30 completely encircles the buoyant pressure vessel 18. In FIG. 3, the yoke 30 is semicircular. Either construction is within the scope of the present invention.

We claim:

1. A device for accurately measuring mass flow of gases, said device comprising:
   an enclosure defining an internal cavity;
   a fluid within said internal cavity, said fluid having a selected level in said enclosure;
   a pressure vessel within said fluid, said pressure vessel having a buoyancy such that said pressure vessel is maintained suspended within said fluid below said level;
   a weight measuring device connected to said pressure vessel; and
   a gas line penetrating said enclosure and being in gas flow communication with an interior of said pressure vessel, said gas line including a capillary tube whereby said gas line applies substantially no loading upon said pressure vessel to affect weighing of said pressure vessel by said weight measuring device.

2. The device of claim 1 wherein said fluid is a liquid.

3. The device of claim 2 wherein said pressure vessel comprises:
   an outer hull member;
   an inner hull member defining an intermediate volume between said inner hull member and said outer hull member; and
   a vent member connecting said intermediate volume to exterior said enclosure whereby any volume change by said inner hull member due to gases within said inner hull member does not affect a volume change by said pressure vessel and thus does not effect buoyancy of said pressure vessel.

4. The device of claim 2 wherein said weight measuring device connected to said pressure vessel repositions said pressure vessel during weight change such that said pressure vessel maintains a substantially constant position within said liquid.

5. The device of claim 3 wherein said liquid is water, said liquid further comprising a detergent to reduce surface tension between said water and said vent member.

6. The device of claim 1 wherein said pressure vessel is a right cylinder having end walls and a longitudinal axis, and wherein said weight measuring device is attached to said pressure vessel with a yoke, with a pivotal point of support positioned whereby said pressure vessel can pivot around an axis passing through a center of mass of gas within said pressure vessel, said axis being transverse to said longitudinal axis.

7. The device of claim 6 wherein said pressure vessel comprises:
a right cylinder outer hull member joined to said end walls;
a right cylinder inner hull member joined to one of said end walls, said inner hull member defining an intermediate volume between said inner hull member and said outer hull member; and
a vent member connecting said intermediate volume to exterior said enclosure whereby any volume change by said inner hull member due to gases within said inner hull member does not effect a volume change by said pressure vessel and thus does not effect buoyancy of said pressure vessel.

8. The device of claim 3 wherein said gas line comprises:
a first gas line portion having a first end in gas communication with an interior of said inner hull member, and a second end;
a second gas line portion having a first end extending through said enclosure, and a second end; and
wherein said capillary tube has a first end sealed to said second end of said first gas line portion and a second end sealed to said second end of said second gas line portion whereby said interior of said inner hull member is in gas communication exterior said enclosure.

9. The device of claim 8 wherein said second gas line portion is provided with a valve to control gas flow into and from said interior of said inner hull member.

10. The device of claim 9 further comprising:
an auxiliary pressure vessel exterior to said enclosure;
a second valve connected to an outlet of said auxiliary pressure vessel;
a common gas outlet from said valve and said second valve; and
an operating connection between said valve from said pressure vessel and said second valve from said auxiliary pressure vessel for selecting gas flow into and from selected of said pressure vessel and said auxiliary pressure vessel through said common gas outlet.

11. The device of claim 10 wherein said common gas outlet is provided with a third valve, said third valve provided with an outlet for connection to external gas systems to selectively provide gas to said third valve and withdraw gas from said third valve.

12. A device for accurately measuring mass flow of gases, said device comprising:
an enclosure defining an internal cavity;
a liquid within said internal cavity, said liquid having a selected level in said enclosure;
a right circular cylindrical pressure vessel within said liquid, said pressure vessel having a buoyancy such that said pressure vessel is maintained suspended within said liquid below said level, said pressure vessel formed from an inner right circular cylinder hull member and an outer right circular cylinder hull member, with an intermediate volume between said inner and outer hull members vented to exterior said enclosure;
a weight measuring device pivotally connected to said pressure vessel whereby said pressure vessel can pivot around an axis passing through a center of mass of said gas within said pressure vessel, said axis being transverse to a longitudinal axis of said pressure vessel; and
a gas line penetrating said enclosure and being in gas flow communication with an interior of said inner hull member of said pressure vessel, said gas line including a capillary tube exterior said pressure vessel whereby said gas line applies substantially no loading upon said pressure vessel to affect weighing of said pressure vessel by said weight measuring device.

13. The device of claim 12 wherein said inner and said outer hull members are concentric and share common one end wall, and wherein said gas line penetrates said one common end wall.

14. The device of claim 12 wherein said weight measuring device connected to said pressure vessel repositions said pressure vessel during weight change such that said pressure vessel maintains a substantially constant position within said liquid.

15. The device of claim 12 wherein said liquid is water, said water further containing a detergent to reduce surface tension between said water and said vent member.

16. The device of claim 12 wherein said gas line comprises:
a first gas line portion having a first end in gas communication with an interior of said inner hull member, and a second end;
a second gas line portion having a first end extending through said enclosure, and a second end; and
wherein said capillary tube has a first end sealed to said second end of said first gas line portion and a second end sealed to said second end of said second gas line portion whereby said interior of said inner hull member is in gas communication exterior said enclosure.

17. The device of claim 16 wherein said second gas line portion is provided with a valve to control gas flow into and from said interior of said inner hull member.

18. The device of claim 17 further comprising:
an auxiliary pressure vessel exterior to said enclosure;
a second valve connected to an outlet of said auxiliary pressure vessel;
a common gas outlet from said valve and said second valve; and
an operating connection between said valve from said pressure vessel and said second valve from said auxiliary pressure vessel for selecting gas flow into and from selected of said pressure vessel and said auxiliary pressure vessel through said common gas outlet.

19. A device for accurately measuring mass flow of gases, said device comprising:

an enclosure defining an internal cavity;

water within said internal cavity, said water having a selected level in said enclosure;

a right circular cylindrical pressure vessel within said water, said pressure vessel having a buoyancy such that said pressure vessel is maintained suspended within said water below said level, said pressure vessel formed from an inner right circular cylinder hull member and an outer right circular cylinder hull member, with an intermediate volume between said inner and outer hull members vented to exterior said enclosure, said inner and outer hull members sharing one common end wall;

a weight measuring device pivotally connected to said pressure vessel whereby said pressure vessel can pivot around an axis passing through a center of mass of said gas within said pressure vessel, said axis being transverse to a longitudinal axis of said pressure vessel, said weight measuring device continuously determining weight of said pressure vessel as a function of gas within said pressure vessel, said weight measuring device repositioning said pressure vessel during weight change such that said pressure vessel maintains a substantially constant position within said water; and a gas line penetrating said enclosure and being in gas flow communication with an interior of said inner hull member of said pressure vessel, said gas line including a capillary tube exterior said pressure vessel whereby said gas line applies substantially no loading upon said pressure vessel to affect weighing of said pressure vessel by said weight measuring device.

20. The device of claim 19 wherein said gas line comprises:

a first gas line portion having a first end in gas communication with an interior of said inner hull member, and a second end;

a second gas line portion having a first end extending through said enclosure, and a second end, said second gas line portion being provided with a valve to control gas flow into and from said interior of said inner hull member; and wherein said capillary tube has a first end sealed to said second end of said first gas line portion and a second end sealed to said second end of said second gas line portion whereby said interior of said inner hull member is in gas communication exterior said enclosure.

* * * * *